United States Patent Office 2,723,973
Patented Nov. 15, 1955

2,723,973

HOMOCYSTEINYL-GLYCINYL-HETEROTRIPEPTIDES

Elbert C. Herrick, Boothwyn, and Charles W. Todd, Westtown-Thornton Road, Pa., assignors to E. I. du Pont de Nemours & Company, Wilmington, Del., a corporation of Delaware No Drawing. Application April 29, 1954,
Serial No. 426,559

9 Claims. (Cl. 260—112)

This invention relates to peptides. More particularly, it relates to synthetic heterotripeptides and to a method for their preparation.

Naturally occurring heteropolypeptides, i. e., polypeptides built up from more than one amino acid, are known to have great biological importance. For example, such natural polypeptides as insulin, glutathione, penicillin, oxytocin, and strepogenin exhibit biological activity as hormones, antibiotics, and growth promoters. Products of markedly varied biological activity may have but slight structural differences.

This invention has as an object the preparation of new tripeptides. A further object is the preparation of new materials of novel and/or improved biological properties. Other objects will appear hereinafter.

These objects are accomplished by the following invention of tripeptides, the amino acid units of which consist of (a) homocysteine, (b) glycine, and (c) glutamic acid or aspartic acid, the benzyl ethers thereof through the thiol group, the esters thereof through the thiol and/or carboxyl groups, the amides, including carbamate esters, through the amino group, and the salts through the amino or carboxyl groups and also the disulfides of the heterotripeptides. Thus the products of this invention are tripeptides of homocysteine, glycine, and glutamic or aspartic acid, derivatives of these acids in which the thiol group is protected by thioester or benzylthioether groups, the amino group by amide or carbamate groups and the carboxyl groups are esterified as well as the salts and disulfides of the tripeptides. The tripeptides of this invention include tripeptides in which the glutamyl radical is in either the alpha or gamma form and the aspartyl radical is in either the alpha or beta form, and those in which the three amino acids are joined in any sequence. The products also include the various configurational isomers, i. e., the optical enantiomorphs, or mixtures of these, that are possible from the asymmetric carbon atoms in the homocysteine and glutamic or aspartic acid moieties.

The tripeptides of this invention that are glutamyl-, or aspartyl-, homocysteinylglycines are especially valuable because of their biological activity. These preferred tripeptides are those of the general formula

XCO—NH—CH—CONH—CH₂COOH
|
CH₂CH₂SH wherein X is

HOOC(CH₂)ₘ—CH(CH₂)ₙ—
|
NH₂ one of n and m being zero and the other a positive integer from one to two, the amides of the same through the amino group, the esters of the same through the carboxyl and/or thiol groups, the S benzyl ethers, and/or the salts and/or the disulfides of these tripeptides. Thus the preferred compounds have the formula

[X]CO—NH—CH—CO—NH—CH₂COOR
|
CH₂CH₂SR′ wherein [X] represents

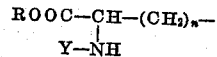

or

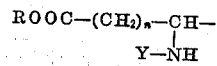

Y is acyl,

or the group

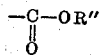

R is hydrogen or a monovalent hydrocarbon radical, R′ is hydrogen or a group which can be removed by hydrolysis or reduction, i. e., benzyl or acyl groups, R″ is a monovalent hydrocarbon radical, and n is 1 or 2. The products of this invention also include the disulfides and the salts of compounds of the above formula.

It is convenient, in preparing the tripeptides of this invention, to use protected amino acids, i. e., amino acids having the amino or carboxyl groups which are not to be coupled in the peptide linkage, and the thiol groups, protected by conversion to carbamate or amide, ester, or to thioester or benzylthioether groups, respectively. The tripeptides of this invention are prepared by the general process illustrated by the following description of the preparation of glutamyl- (or aspartyl-) homocysteinylglycines. One carboxyl group of glutamic or aspartic acid is first converted to an azide or mixed anhydride and then condensed with the amino group of a carboxyl- and mercaptan-protected homocysteinylglycine. The particular derivative of glutamic or aspartic acid chosen for this condensation is dependent on whether the alpha form of the glytamyl or aspartyl radical is desired in the tripeptide or whether the beta form of the aspartyl radical or the gamma form of the glutamyl radical is desired. If the alpha form is desired, the carboxyl group adjacent to the amino-bearing carbon of glutamic or aspartic acid is converted to a mixed anhydride, preferably a mixed anhydride with an alkyl carbonic acid, and the other carboxyl group is protected by conversion to an ester, e. g., the ethyl ester. When the gamma form of the glutamyl tripeptide or the beta form of the aspartyl tripeptide is desired, the carboxyl group of the dibasic amino acid adjacent to the amino-bearing carbon is left free and the other is first esterified, e. g., by ethyl alcohol, and the resulting ester group is then converted to the azide group by reaction with hydrazine hydrate followed by sodium nitrite. The tripeptides are then formed by condensing the glutamyl or aspartyl azide or mixed alkyl carbonic anhydride with the amino group of a protected homocysteinylglycine. The resulting protected tripeptide can, if desired, be converted to the free tripeptide by removing the blocking groups by conventional methods.

An especially good way of preparing the preferred α-glutamyl-, or aspartyl-, homocysteinylglycines of this invention is illustrated by the following description of the preparation of the α-glutamyl peptide. γ-Ethyl-L-glutamate hydrochloride, prepared from L-glutamic acid and ethanol in the presence of dry hydrogen chloride by the method of Green and Stahmann, J. Biol. Chem. 197, 771–782 (1952), is treated in aqueous medium with benzyl chloroformate in the presence of sodium bicarbonate and magnesium oxide at low temperature, e. g., 0° to 25° C., followed by acidification with sulfuric acid to protect the amino group with a carbobenzyloxy radical. The resulting γ-ethyl N-carbobenzyloxy-L-glutamate is converted to a mixed carbonic anhydride by treatment with a slight excess, e. g., 10% excess, of an alkyl chloroformate, e. g., isobutyl chloroformate, in the presence of a tertiary amine, e. g., triethylamine, at a temperature of −5° C. in an inert solvent, e. g., toluene. The resulting reaction solution containing the mixed anhydride is reacted with a solution of ethyl S-benzyl-DL-homocysteinylglycinate hydrobromide in an inert solvent, e. g., toluene or dioxane, and in the presence of more triethylamine at a temperature of about −5° C. for a few hours and then warmed to room temperature overnight. If desired, this and the preceding reaction can be carried out at the reflux temperature of the systems for a few minutes, followed by cooling to −5° C. The reaction mixture is treated with water and chloroform to bring all reaction products into solution. Solid diethyl N-carbobenzyloxy - L - α - glutamyl - S-benzyl-DL-homocysteinylglycinate is isolated from the organic solution of the reaction mixture after purification with dilute aqueous sodium bicarbonate solution, by drying with anhydrous magnesium sulfate, and concentration under reduced pressure. The ethyl S-benzyl-DL-homocysteinylglycinate hydrobromide may be prepared as described in our filed copending application Serial No. 426,286, filed April 28, 1954.

The ester groups of this protected tripeptide can be removed by saponification with aqueous sodium hydroxide in the presence of dioxane at room temperature, followed by acidification with hydrochloric acid. The free tripeptide can be obtained from the N-carbobenzyloxy-L-α-glutamyl-S-benzyl-DL-homocysteinylglycine by treatment with sodium in liquid ammonia in rigorously dried apparatus under a nitrogen atmosphere and at a temperature of about −30° to −80° C. At the completion of the reduction a slight excess of ammonium chloride is added and the crude L-α-glutamyl-DL-homocysteinylglycine is isolated by evaporation of ammonia at room temperature and finally at reduced pressure. The crude tripeptide is purified by conversion to the mercuric salt of the thiol group of the tripeptide. This is accomplished by dissolving the crude tripeptide in cold aqueous dilute sulfuric acid, followed by careful addition of mercuric sulfate reagent (described in Biochemical Preparations 2, 88 (1952)) to the mixture maintained at about 0 to 5° C. and at a pH of 1.5 by addition of aqueous sodium hydroxide solution. The precipitated mercuric salt is washed thoroughly with cold dilute sulfuric acid and cold oxygen-free water. The mercuric salt of L-α-glutamyl-DL-homocysteinylglycine is converted to the free tripeptide by treating its aqueous suspension with hydrogen sulfide, followed by lyophilization of the solution. Lyophilization is the process of drying from the frozen state (Neurath and Bailey, "The Proteins," Academic Press, 1953, vol. I, part A, page 31, second full paragraph). Further purification of the product may be carried out by treatment with barium hydroxide solution and dilute sulfuric acid solution and final lyophilization.

A preferred way of preparing the γ-glutamyl-, or β-aspartyl-, homocysteinylglycines of this invention is illustrated by the following description of the preparation of L-γ-glutamyl-DL-homocysteinylglycine; N-carbobenzylozy-L-γ-glutamylhydrazide is prepared by a modification of the procedure described by LeQuesne and Young, J. Chem. Soc. 1959 (1950). To an absolute ethanol solution of γ-ethyl N-carbobenzyloxy-L-glutamate (prepared as described above) maintained at room temperature (20–25° C.) is added hydrazine hydrate. After concentrating by distillation under reduced pressure, the reaction mixture is made acid with concentrated hydrochloric acid and the resulting precipitate is diluted with water, neutralized with sodium acetate, and purified by washing and crystallization. To an aqueous solution of the resulting N-carbobenzyloxy-L-γ-glutamylhydrazide is added concentrated hydrochloric acid and chloroform and the mixture is cooled in an ice bath whereupon the mixture is treated with aqueous sodium nitrite solution. The resulting reaction mixture is rapidly separated into the aqueous and chloroform layers. To this chloroform solution is added a chloroform solution of ethyl S-benzyl-DL-homocysteinylglycinate hydrobromide and diethylaniline, and sufficient triethylamine to effect solution, the reaction mixture being maintained at about 0° to 5° for several hours and then allowed to stand at room temperature overnight. The chloroform solution is extracted with dilute aqueous hydrochloric acid, washed with water, and concentrated under reduced pressure. The residue hardens upon addition of hexane, followed by cooling. This residue is dissolved in ethyl acetate and decolorized with activated carbon. On evaporation of the ethyl acetate solution, there is obtained ethyl N-carbobenzyloxy-L-γ-glutamyl-S-benzyl-DL-homocysteinylglycinate.

As in the case of the protected α-glutamyl-, or α-aspartyl-, homocysteinylglycines, the ester groups can be removed by saponification with aqueous sodium hydroxide in dioxane solution followed by acidification with hydrochloric acid. As in the case of the alpha derivatives, the free tripeptide can be obtained from a liquid ammonia solution of the N-carbobenzyloxy-L-γ-glutamyl-S-benzyl-DL-homocysteinylglycine by reduction with sodium in liquid ammonia at low temperature. The free peptide can then be converted to the mercuric salt by addition of mercuric sulfate reagent. The free tripeptide, L-γ-glutamyl-DL-homocysteinylglycine, is obtained from the mercuric salt by treatment with hydrogen sulfide followed by lyophilization.

Commercially available glutamic and aspartic acids can be used as the starting materials for the tripeptides of this invention. The homocysteinylglycines used as intermediates are prepared as described in our copending application Serial No. 426,286.

The various configurational isomers of the tripeptides of this invention can be prepared by the general method described above by starting with the appropriate enantiomorphs of glutamic or aspartic acids and of homocysteinylglycines. That is, the various D-, L-, or DL-enantiomorphs or combinations of these can be used in the process of this invention.

The invention is illustrated in further detail by the following examples.

*Example I.—Diethyl N-carbobenzyloxy-L-α-glutamyl-S-benzyl-DL-homocysteinylglycinate*

A. γ-ETHYL L-GLUTAMATE HYDROCHLORIDE

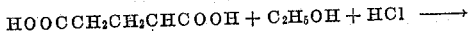

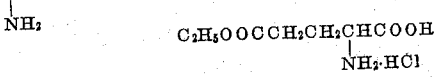

A reaction vessel equipped with mechanical stirrer, condenser and thermometer is charged with 750 ml. of absolute ethanol and dry hydrogen chloride is passed in until 47 g. (1.29 moles) is dissolved. After the temperature of the reaction mixture recedes to 36° C., 78 g. (0.525 mole) of L-glutamic acid is added in three portions over a period of five minutes with no evidence of an increase in temperature. The temperature of the solution is lowered to 30° C. and stirring is continued for fifteen minutes. At this time some solid remains undissolved so dry hydrogen chloride is passed into the reaction mixture until the bulk of the remaining solid dissolves, about one minute being required, and the temperature rising to 33° C. After stirring for ten minutes more, the solution is filtered through a sintered glass funnel to remove a trace of solid residue. The solution is concentrated under reduced pressure, about 15 mm. of mercury, to a white solid residue which is dissolved in 150 ml. of hot absolute ethanol. The alcohol solution is filtered and then diluted with 750 ml. of absolute ether to precipitate γ-ethyl L-glutamate hydrochloride. The product is filtered from the reaction mixture and dried in a vacuum oven at room temperature over phosphorus pentoxide. A yield of 37.6 g. (33.8% of theory) is obtained and the product melts at 135° C.

B. γ-ETHYL N-CARBOBENZYLOXY-L-GLUTAMATE

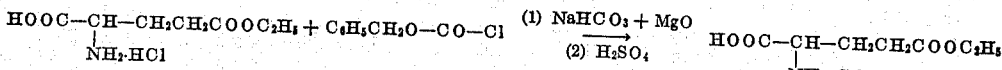
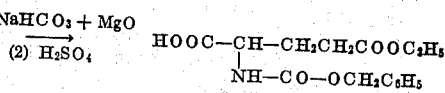

A solution of 32.6 g. (0.154 mole) of γ-ethyl L-glutamate hydrochloride in 160 ml. of water is brought to pH 5 with 45 ml. of 4N aqueous sodium hydroxide solution. To this solution there is then added 13.4 g. (0.20 mole) of sodium bicarbonate and 8.02 g. (0.25 mole) of magnesium oxide. The reaction vessel is cooled in an ice bath and stirred mechanically while 47.0 g. (0.27 mole) of benzyl chloroformate is added during a period of eighteen minutes, the temperature being maintained at 3°±2° C. Stirring is continued for one hour with the mixture cooled by an ice bath and for one-half hour at room temperature. The mixture is then filtered and the solid washed with 50 ml. of 0.5N aqueous sodium hydroxide. The filtrate is extracted with three 100-ml. portions of diethyl ether to remove excess benzyl chloroformate. The water layer is then acidified to Congo red paper with 5N sulfuric acid. The oil which forms is separated and the water layer is extracted with three 100-ml. portions of ether. The ether extracts are combined with the oil and washed with three 50-ml. portions of water. The ether solution is dried over anhydrous magnesium sulfate and concentrated. The resulting oil is dissolved in ethyl acetate and hexane is added until a solid preciptate is obtained. This precipitate of γ-ethyl N-carbobenzyloxy-L-glutamate is isolated by filtration. A total yield of 25.04 g. (52.5% of theory) is obtained in two crops; the first crop, amounting to 16.5 g., melting at 76° C., and the second crop amounting to 8.54 g. A small sample recrystallized from hexane melts at 82° C. and analyzes as follows:

*Analysis.*—Calculated for $C_{15}H_{19}NO_6$: C, 58.24%; H, 6.19%; N, 4.53%. Found: C, 58.02%; H, 6.08%; N, 4.54%.

C. DIETHYL N-CARBOBENZYLOXY-L-α-GLUTAMYL-S-BENZYL-DL-HOMOCYSTEINYLGLYCINATE

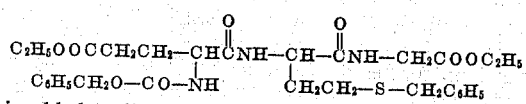
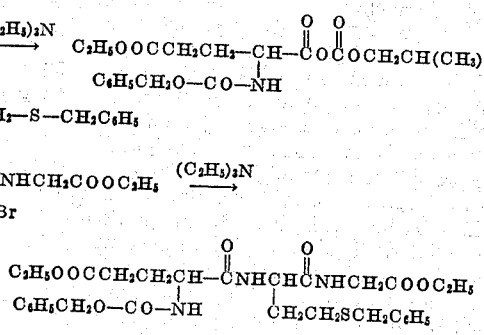

A glass reaction vessel which has been flame-dried and cooled under nitrogen is charged with 2.48 g. (0.008 mole) of γ-ethyl N-carbobenzyloxy-L-glutamate, 100 ml. of toluene and 1.11 ml. (0.008 mole) of redistilled triethylamine. The ethyl ester dissolves slowly. When solution is complete, the solution is cooled to —5° C., 1.15 ml. (0.0088 mole) of isobutyl chloroformate is added, and the solution is stirred for twenty two minutes at —5° C., during which time a fine precipitate of triethylamine hydrochloride forms. To this solution there is added a solution of 3.13 g. (0.008 mole) of ethyl S-benzyl-DL-homocysteinylglycinate hydrobromide (prepared as described in our copending application Serial No. 426,286) and 2.45 ml. (0.0176 mole) of redistilled triethylamine in 180 ml. of toluene (it is necessary to warm the mixture slightly to obtain solution of the dipeptide, after which the solution is cooled to —5° C.) during a period of fifteen minutes. The reaction mixture is stirred at —5° C. for 1¾ hours and is then allowed to stand at room temperature overnight. The gelatinous solid which forms is dissolved by addition of 75 ml. of water and 50 ml. of chloroform. The reaction mixture is filtered, and the organic layer is separated and extracted twice with 3% aqueous sodium bicarbonate solution and twice with distilled water. This solution is dried over magnesium sulfate, pressure filtered under nitrogen, and concentrated under a pressure of 15 mm. of mercury to a white solid residue. This crude product, after air drying, amounts to 4.16 g. (86.5% of theory) and has a melting point of 105–107° C. The crude solid is dissolved in ethyl acetate, the resulting solution is decolorized with activated carbon, and then diluted with hexane to precipitate 3.23 g. (67% of theory) of diethyl N-carbobenzyloxy-L-α-glutamyl-S-benzyl-DL-homocysteinylglycinate, melting at 116–118° C.

*Analysis.*—Calculated for $C_{30}H_{39}O_8N_3S$: N, 6.98%; S, 5.33%. Found: N, 6.85%; S, 5.28%.

*Example II.*—N - carbobenzyloxy-L-α-glutamyl-S-benzyl-DL-homocysteinylglycine

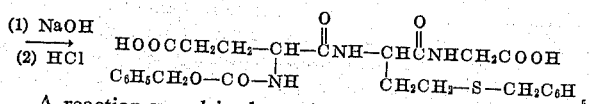

A reaction vessel is charged with 1.81 g. (0.003 mole) of diethyl N-carbobenzyloxy-L-α-glutamyl-S-benzyl-DL-homocysteinylglycinate and 18 ml. of dioxane followed by 0.5 ml. of 1N aqueous sodium hydroxide to bring the pH to 7.4. An additional 6.6 ml. (0.0066 mole) of 1N aqueous sodium hydroxide is then added. The solution is allowed to stand 1¼ hours at room temperature, during which time a yellowish color develops. Upon addition of 7.1 ml. (0.0071 mole) of 1N hydrochloric acid the yellow color disappears and the pH falls to about 5. An additional 0.5 ml. of 1N hydrochloric acid brings the pH to about 3.5. The solution is filtered to remove traces of insoluble material and is then concentrated under a pressure of about 15 mm. of mercury without heating. The oily residue is dissolved in ethyl acetate and extracted with one 30-ml. and three 10-ml. portions of saturated sodium bicarbonate solution. The combined aqueous bicarbonate solutions are acidified to Congo red paper with 2N hydrochloric acid. The oil which forms hardens on cooling and is separated by centrifugation, and is washed three times with 20-ml. portions of ice cold distilled water. The solid is then dried over phosphorus pentoxide in a vacuum oven at room temperature. There is obtained 0.93 g., corresponding to a yield of 57%, of N-carbobenzyloxy-L-α-glutamyl-S-benzyl-DL-homocysteinylglycine.

*Analysis.*—Calculated for $C_{26}H_{31}N_3O_8S$: C, 57.37%; H, 5.73%; N, 7.70%; S, 5.88%; N. E., 273. Found: C, 56.60%; H, 5.84%; N, 7.63%; N. E., 285.

*Example III.*—Mercuric salt of L-α-glutamyl-DL-homocysteinylglycine

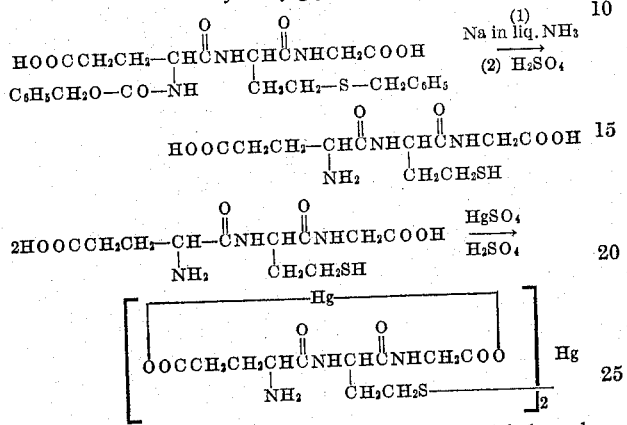

A reaction vessel which has been flame-dried and cooled under nitrogen is charged with 100 ml. of liquid ammonia (distilled from sodium). A cooling bath of solid carbon dioxide and acetone is maintained around the reaction vessel and a nitrogen atmosphere is maintained inside the vessel. The vessel is charged with 2.24 g. (0.0041 mole) of N-carbobenzyloxy-L-α-glutamyl-S-benzyl-DL-homocysteinylglycine, and clean sodium amounting to 0.44 g. (0.0192 mole) is added in small portions during nine minutes. The mixture is stirred for thirty minutes, at the end of which the blue color has disappeared. There is then added 1.4 g. (0.0105 mole, 10% excess) of ammonium chloride and in fifteen minutes the cooling bath is removed. Ammonia is evaporated from the reaction mixture at room temperature, first at atmospheric pressure and then finally under a pressure of about 15 mm. of mercury. The dry, white solid residue is dissolved in 30 ml. of cold 0.5N sulfuric acid. The trace of residue filtered out is discarded. The solution is blanketed with nitrogen and cooled in an ice-salt bath. Mercuric sulfate reagent (200 g. HgSO4, 50 ml. of 10N H2SO4, 40 ml. of conc. H2SO4, and 600 ml. of water are mixed in the order given) is added dropwise. The initial precipitate which forms dissolves rapidly. The pH of the mixture is brought to 1.5 by addition of 2N sodium hydroxide solution whereupon addition of the mercuric sulfate reagent is continued until precipitation is complete. The precipitate is placed in two 40-ml. centrifuge tubes and thoroughly washed with 20 ml. of cold 0.5N sulfuric acid and then with three 20-ml. portions of cold oxygen-free water. The thoroughly washed mercuric salt of L-α-glutamyl-DL-homocysteinylglycine still contains traces of inorganic sulfate which is removed by the procedure used for the purification of L-α-glutamyl-DL-homocysteinylglycine described in Example IV.

*Example IV.*—L-α-glutamyl-DL-homocysteinylglycine

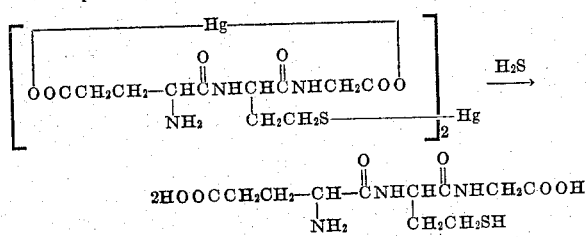

An acidic solution of the mercuric salt of L-α-glutamyl-DL-homocysteinylglycine, prepared by the process of Example III, is treated with hydrogen sulfide for eight hours at room temperature (about 25° C.). The mercuric sulfide which forms as a precipitate is removed by filtration and washed six times with oxygen-free water. The filtrate and washings are combined, treated with saturated barium hydroxide solution to remove inorganic sulfate, and then treated with 0.1N sulfuric acid to remove excess barium. The filtered solution is lyophilized, and there is obtained 0.86 g. of L-α-glutamyl-DL-homocysteinylglycine monohydrate.

*Analysis.* — Calculated for $C_{11}H_{19}N_3O_6S \cdot H_2O$: C, 38.93%; H, 6.24%; N, 12.48%; S, 9.45%. Found: C, 38.78%; H, 6.34%; N, 12.63%; S, 9.01%.

*Example V.* — Ethyl N-carbobenzyloxy-L-γ-glutamyl-S-benzyl-DL-homocysteinylglycinate

A. N-CARBOBENZYLOXY-L-γ-GLUTAMIC ACID HYDRAZIDE

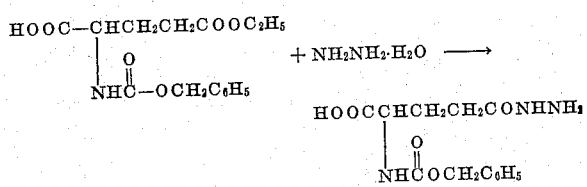

A reaction vessel is charged with 12.4 g. (0.04 mole) of γ-ethyl N-carbobenzyloxy-L-glutamate (prepared as described in sections A and B of Example I) and 40 ml. of absolute ethanol. To this mixture is added slowly 14 ml. (0.284 mole) of 64% hydrazine hydrate. The temperature of the mixture rises to 30° on addition of the first few drops. The mixture is then cooled to 22° C. and no further temperature rise is noted. The mixture is allowed to stand at room temperature (about 25° C.) for forty-two hours whereupon the solution is concentrated under reduced pressure, about 15 mm. of mercury, and concentrated hydrochloric acid is added until the solution is acid to Congo red paper. Water is added to the copious white precipitate for ease of handling. The mixture is neutralized with saturated aqueous sodium acetate and then filtered. The precipitate is washed twice with cold distilled water and then dissolved in boiling water. The product crystallizes on cooling into needles melting at 171–172° C. This N-carbobenzyloxy-L-γ-glutamic acid hydrazide recrystallized from about 425 ml. of boiling distilled water amounts to 8.71 g., corresponding to a yield of 70%, and melts at 175–177° C.

B. N-CARBOBENZYLOXY-L-γ-GLUTAMIC ACID AZIDE

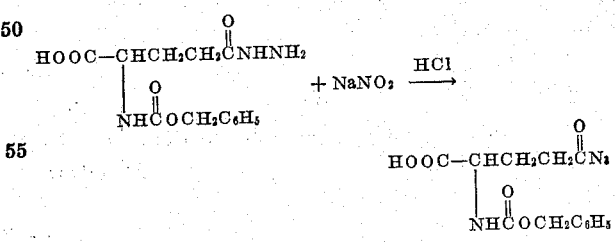

A reaction vessel cooled by an ice bath is charged with a solution of 6.22 g. (0.02 mole) of N-carbobenzyloxy-L-γ-glutamic acid hydrazide in 100 ml. of cold distilled water. Ten milliliters of concentrated hydrochloric acid and 100 ml. of chloroform are added to the solution and the mixture cooled to about 0°. A solution of 2.28 g. (0.03 mole) of sodium nitrite in 20 ml. of water is added during seven minutes. The mixture is stirred for six minutes in the ice bath. The reaction mixture is worked up as rapidly as possible, keeping the chloroform solution cold at all times. The two layers are separated and the aqueous layer is washed with 20 ml. of chloroform which is then added to the chloroform layer. The combined chloroform solutions are washed twice with 20 ml. of cold water, the entire work-up period being 37 minutes, and dried over anhydrous sodium sulfate. This chloroform solution contains N-carbobenzyloxy-L-γ-glutamic acid azide.

C. ETHYL N - CARBOBENZYLOXY - L - γ - GLUTAMYL-S-BENZYL-DL-HOMOCYSTEINYLGLYCINATE

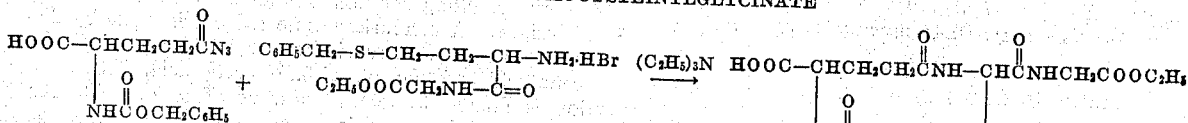

To the chloroform solution of N-carbobenzyloxy-L-γ-glutamic acid azide of the preceding paragraph is added a solution of 7.82 g. (0.02 mole) of ethyl S-benzyl-DL-homocysteinylglycinate hydrobromide (prepared as described in our copending application Serial No. 426,286) in 100 ml. of chloroform, 6.4 ml. (0.04 mole) of diethylaniline, and 2.78 ml. (0.02 mole) of triethylamine. The triethylamine is necessary to effect solution of the ingredients. The solution of the dipeptide is added to the azide solution during a period of fifty minutes and the temperature of the reaction mixture is maintained at about 0° C. The mixture is stirred in an ice bath for 3.5 hours and then for one hour at room temperature and finally allowed to stand overnight at room temperature (about 25° C.). The resulting yellow solution is extracted with a 40 ml. portion of 1N hydrochloric acid (0.04 mole) and then with four 25-ml. portions of 0.5N hydrochloric acid. After washing with three 25-ml. portions of distilled water, the chloroform solution is dried over anhydrous magnesium sulfate, filtered, and concentrated under a pressure of about 15 mm. of mercury to a gummy brown residue. The residue hardens upon addition of hexane and cooling. The residue is dissolved in ethyl acetate and decolorized with activated carbon. On evaporation of the ethyl acetate, there is obtained 8.03 g., corresponding to a 70% yield, of ethyl N-carbobenzyloxy-L-γ-glutamyl-S - benzyl - DL - homocysteinylglycinate. An analytical sample dried under vacuum at 56° C. for 2.5 hours melts at 93–96° C.

*Analysis.*—Calculated for $C_{28}H_{35}N_3O_8S$: N, 7.3%; S, 5.5%. Found: N, 8.19%; S, 4.82%.

Example VI.—N-carbobenzyloxy-L-γ-glutamyl-S-benzyl-DL-homocysteinylglycine

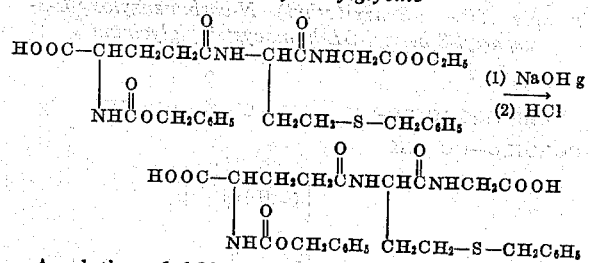

A solution of 6.89 g. (0.012 mole) of ethyl N-carbobenzyloxy - L - γ - glutamyl - S - benzyl - DL - homocysteinyl-glycinate in 69 ml. of dioxane is added to 27.6 ml. (0.0276 mole, 15% excess) of 1N sodium hydroxide, and the solution is allowed to stand 1¼ hours at room temperature. Twenty-seven and six tenths milliliters of 1N hydrochloric acid is added and the solution is then concentrated at reduced pressure, about 15 mm. of mercury, at room temperature. The residue is taken up in ethyl acetate and extracted with saturated aqueous sodium bicarbonate solution. The aqueous bicarbonate solution is extracted twice with 25 ml. of ether and then acidified with 6N hydrochloric acid while being cooled in ice. The gummy precipitate is centrifuged, washed with two 15-ml. portions of water and dried over phosphorus pentoxide at about 15 mm. of mercury. The crude product amounts to 5.16 g., corresponding to a yield of 79%. It has a neutral equivalent of 313, the calculated value being 273. The crude product is dissolved in ethyl acetate, filtered to remove a trace of insoluble residue, and treated with decolorizing carbon. The colorless solution is then concentrated under reduced pressure and the residue is diluted with hexane. The precipitate which forms is chilled in a solid carbon dioxide-acetone bath and separated from the solution by centrifugation. The gummy precipitate is redissolved in ethyl acetate and reprecipitated as described above. The purified N-carbo-benzyloxy - L - γ - glutamyl - S - benzyl - DL - homocysteinylglycine amounts to 4.35 g., corresponding to 66.5% of theory.

*Analysis.*—Calculated for $C_{26}H_{31}N_3O_8S$: N, 7.70%; S, 5.88%; N. E., 273. Found: N, 8.00%; S, 5.47%; N. E., 300.

Example VII.—Mercuric salt of L-γ-glutamyl-DL-homocysteinylglycine

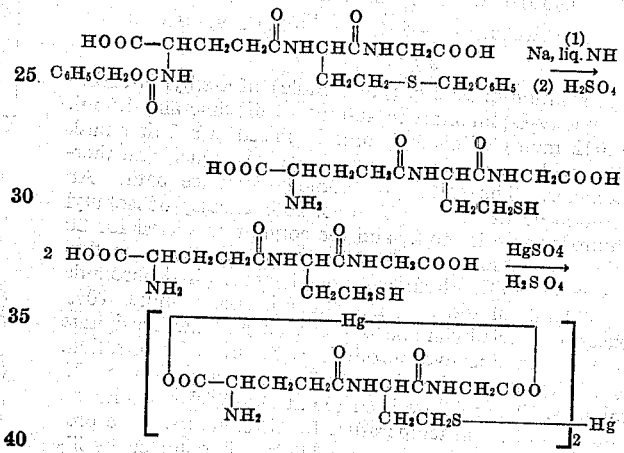

N - carbobenzyloxy - L - γ - glutamyl - S - benzyl-DL-homocysteinylglycine (5.45 g., 0.01 mole) is converted to the free tripeptide by sodium in liquid ammonia, and this in turn to the mercuric salt of L-γ-glutamyl-DL-homocysteinylglycine by the procedures described in Example III for the α-glutamyl peptide.

Example VIII.—L-γ-glutamyl-DL-homocysteinylglycine

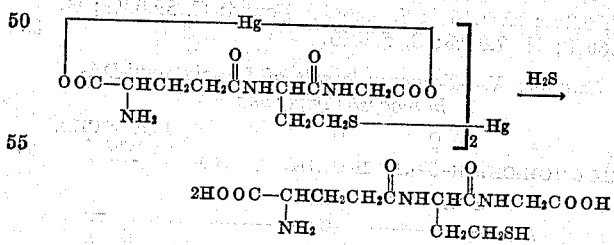

The mercuric salt of L-γ-glutamyl-DL-homocysteinylglycine of Example VII is converted to the free tripeptide by treatment with hydrogen sulfide by the procedure of Example IV but using twice the amount of N-carbobenzyloxy - L - γ - glutamyl - S - benzyl - DL - homocysteinylglycine (10.9 g. 0.062 mole). There is obtained 4.7 g. of the monohydrate of L-γ-glutamyl-DL-homocysteinylglycine.

*Analysis.* — Calculated for $C_{11}H_{19}N_3O_6S \cdot H_2O$: C, 38.93%; H, 6.24%; S, 9.45%; N, 12.48%. Found: C, 39.12%; H, 6.28%; S, 9.30%; 9.51%; N, 12.45%; 12.86%.

The paper chromatogram, using 80% n-propyl alcohol/20% water as solvent, in the presence of N-ethylmaleimide, gave one spot, Rf value 0.14. After hydrolysis of the tripeptide, paper chromatograms gave spots corresponding to those obtained from a mixture of the three amino acids of the tripeptide.

*Example IX.—γ-ethyl(methyl) N-carbobenzyloxy-L-α-glutamyl-S-benzyl-DL-homocysteinylglycinate*

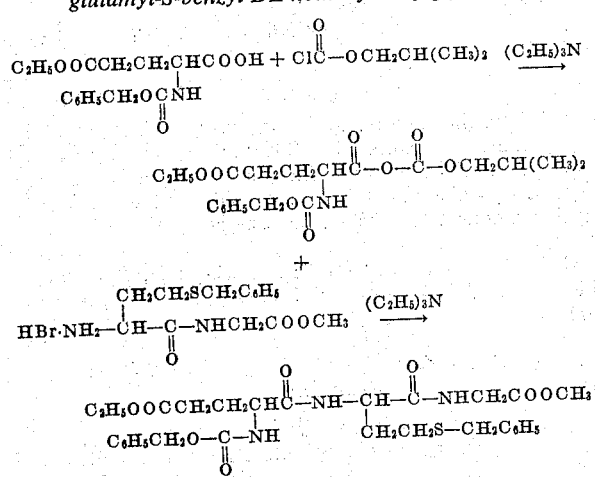

A solution of 9.92 g. (0.032 mole) of γ-ethyl N-carbobenzyloxy-L-glutamate in 400 ml. of dioxane and 4.4 ml. (0.032 mole) of triethylamine is placed in a 2-liter flask fitted with mechanical stirrer, dropping funnel, and thermometer. The solution is cooled in an ice bath. An addition of 4.8 g. (0.0352 mole, 10% excess) of isobutyl chloroformate is made, and the solution is stirred for 20 minutes. A solution of 9.05 g. (0.032 mole) of methyl S - benzyl - DL - homocysteinylglycinate hydrobromide in 400 ml. of dioxane, and 9.8 ml. (0.070 mole, 10% excess) of triethylamine is made up and the precipitate of triethylamine hydrobromide is removed by filtration. The filtered solution is added during a period of 25 minutes. The mixture is stirred at 10–15° for two hours, and then at room temperature for three hours. The precipitate of triethylamine hydrochloride is removed by filtration. The solution is concentrated under 15–20 mm. pressure. The residue is diluted with dioxane and lyophilized. The crude solid weighs 14.4 g. (76.5% yield). The solid is triturated with ether and the resulting γ - ethyl(methyl) N - carbobenzyloxy - L - α - glutamyl-S-benzyl-DL-homocysteinylglycinate amounts to 6.4 g. (34% yield).

*Analysis.*—Calculated for $C_{29}H_{37}N_3SO_8$: C, 59.4%; H, 6.2%; N, 7.16%; S, 5.46%. Found: C, 59.08%; H, 6.66%; N, 7.08%; S, 5.20%.

*Example X.—Trimercuric salt of L-α-glutamyl-DL-homocysteinylglycine*

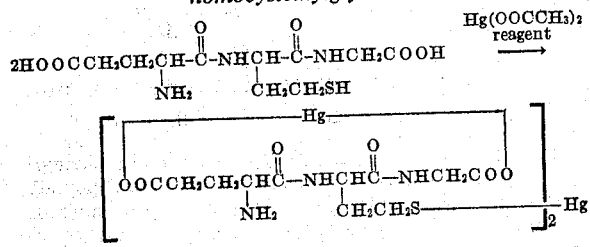

A glass reaction vessel is flame dried and cooled under nitrogen. About 100 ml. liquid ammonia (commercial grade) is distilled from sodium into the reactor equipped with a mechanical stirrer and gas inlet and exit tubes. The reaction vessel is cooled in a solid carbon dioxide/acetone bath throughout the experiment. An addition of 3.28 g. (0.006 mole) of N-carbobenzyloxy-L-α-glutamyl-S-benzyl-DL-homocysteinylglycine is made. Clean sodium amounting to 0.73 g. (0.0316 mole) is added, and this produces a deep blue solution, the color of which persists for ten minutes. An addition of 2.44 g. (0.0316 mole) of ammonium acetate is made and the solution is stirred for ten minutes. The cooling bath is then removed, and the ammonia is evaporated at room temperature.

The white solid residue is dissolved in 0.5N acetic acid, and the resulting solution is filtered to remove a trace of residue. A mercuric acetate reagent is made by dissolving 50 g. of mercuric acetate in 20 ml. of glacial acetic acid and 200 ml. of 0.5N acetic acid. The solution is filtered to remove a trace of solid. Nineteen milliliters of the mercuric acetate reagent is added to the solution of the tripeptide until there is no further precipitation of the mercuric salt. The precipitate is removed by filtration and washed five times with 5-ml. portions of cold oxygen-free water. The solid is dried at 55° C. in a vacuum oven at about 25 mm. pressure. The trimercuric salt of L-α-glutamyl-DL-homocysteinylglycine amounts to 3.3 g. (88% yield).

*Analysis.*—Calculated for $C_{22}H_{36}N_6S_2O_{12}\cdot 3Hg$: C, 21.26%; H, 2.92%; N, 6.77%; S. 5.16%. Found: C, 21.06%; H, 3.16%; N, 6.51%; S. 4.75%.

*Example XI.—L-α-glutamyl-DL-homocysteinylglycine*

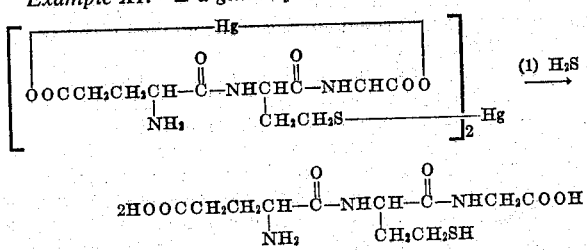

Hydrogen sulfide is passed into a suspension of 3.2 g. (0.00257 mole) of trimercuric salt of L-α-glutamyl-DL-homocysteinylglycine in 100 ml. of oxygen-free water for five hours. The precipitate of mercuric sulfide is removed by filtration under nitrogen pressure, and the filtrate is lyophilized. The L-α-glutamyl-DL-homocysteinylglycine amounts to 1.35 g. (82% yield).

*Analysis.*—Calculated for $C_{11}H_{19}N_3O_6S$: C, 41.11%; H, 5.96%; N, 13.07%; S, 9.98%. Found: C, 40.20%; H, 6.11%; N, 13.11%; S, 9.48%.

*Example XII.—α-Benzyl(ethyl) N-carbobenzyloxy-L-β-aspartyl-S-benzyl-DL-homocysteinylglycinate*

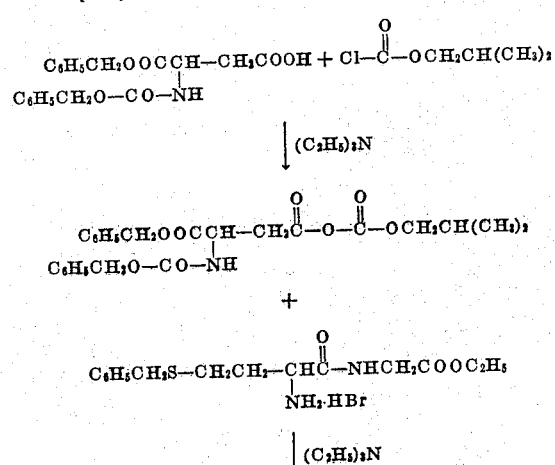

A solution of 11.41 g. (0.032 mole) of α-benzyl-N-carbobenzyloxy-L-aspartate (prepared as described by M. Bergmann, L. Zervass and L. Salzman, Berichte, 66, 1288 (1933)) in 200 ml. of toluene and 3.24 g. (0.032 mole) of triethylamine is cooled to −5° C. An addition of 4.84 g. (0.0352 mole, 10% excess) of isobutyl chloroformate is made and the solution is stirred for 25 minutes at −5° C. A solution of 12.52 g. (0.032 mole) of ethyl-S-benzyl-DL-homocysteinylglycine hydrobromide in 250 ml. of chloroform, 200 ml. of toluene and 3.88 g. (0.038 mole) of triethylamine is added during a period of 50 minutes. The mixture is stirred at −5° C. for two hours, and then at room temperature for 3½ hours. The white precipitate is dissolved by the addition of 400 ml. of chloroform and 100 ml. of water. The mixture is filtered, and the organic layer is separated and extracted in turn with three 150-ml. portions of 3% aqueous sodium bicarbonate solution, three 100-ml. portions of 0.5N hydrochloric acid and three 100-ml. portions of distilled water. The organic layer is dried over anhydrous magnesium sulfate, and concentrated under a pressure of about 15 mm. of mercury to a solid residue, weighing about 16 g. After recrystallization from ethyl acetate-hexane the α-benzyl(ethyl) N-carbobenzyloxy-L-β-aspartyl-S-benzyl-DL-homocysteinylglycinate amounts to 14.8 g. (71% yield).

Analysis.—Calculated for $C_{34}H_{39}N_3SO_8$: C, 62.85%; H, 6.05%; N, 6.47%. Found: C, 62.43%; H, 6.01%; N, 6.73%, 6.76%.

*Example XIII.—N-carbobenzyloxy-L-β-aspartyl-S-benzyl-DL-homocysteinylglycine*

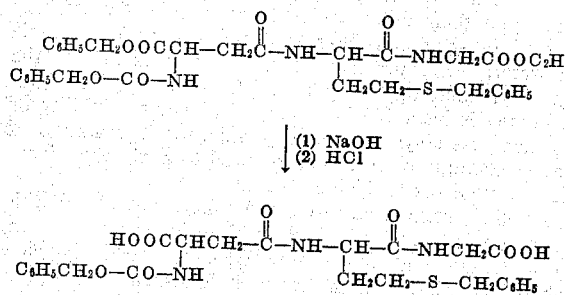

A solution of 13.0 g. (0.02 mole) of α-benzyl(ethyl) N-carbobenzyloxy-L-β-aspartyl-S-benzyl-DL-homocysteinylglycinate in 130 ml. of dioxane is added to 46 ml. (0.046 mole, 15% excess) of 1N sodium hydroxide. The solution is stirred at room temperature for one hour and twenty minutes. The solution is neutralized with 46 ml. of 1N hydrochloric acid and concentrated under a pressure of about 15 mm. of mercury to a residue of about 15 ml. The residue is extracted with ethyl acetate. The ethyl acetate solution is extracted with three 50-ml. portions of an aqueous solution containing 10.1 g. of sodium bicarbonate. The sodium bicarbonate solution is cooled in an ice bath and acidified to Congo red paper with 3N hydrochloric acid. The crude product which precipitates is isolated by filtration and amounts to 10.11 g. After recrystallization from ethyl acetate-hexane the product amounts to 8.52 g. Determination of the neutral equivalent indicates that saponification is not complete.

The crude product is dissolved in 130 ml. of dioxane, 46 ml. of 1N sodium hydroxide is added, and the solution is allowed to stand at room temperature for one hour. After the addition of 46 ml. of 1N HCl the solution is concentrated under a pressure of about 15 mm. of mercury to a residue of about 15 ml. The residue is extracted with ethyl acetate and the ethyl acetate solution dried with anhydrous magnesium sulfate, diluted with hexane and cooled. The precipitate of N-carbobenzyloxy-L-β-aspartyl-S-benzyl-DL-homocysteinylglycine amounts to 6.95 g. (65.3% yield) and has $[\alpha]_D^{23.9}$ of +13.77° (0.1017 g. in 10 ml. of absolute ethanol).

Analysis.—Calculated for $C_{25}H_{29}N_3SO_8$: C, 56.49%; H, 5.50%; N, 7.91%; N. E., 266. Found: C, 56.92%; H, 5.79%; N, 7.63%, 7.74%; N. E., 256.

*Example XIV.—Mercuric salt of L-β-aspartyl-DL-homocysteinylglycine*

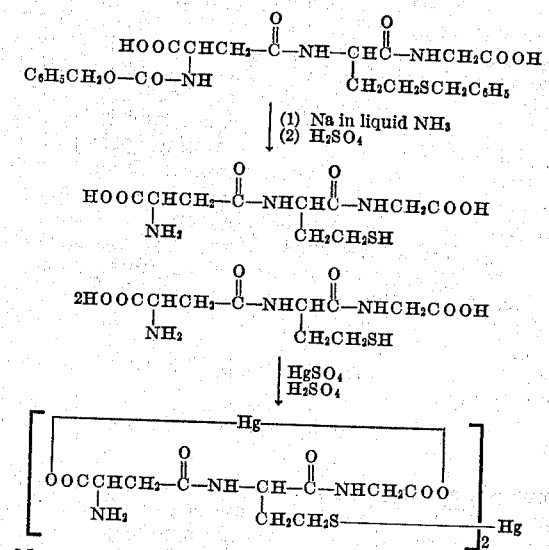

N-carbobenzyloxy-L-β-aspartyl-S-benzyl-DL-homocysteinylglycine (6.39 g., 0.012 mole) is converted to the free tripeptide by sodium in liquid ammonia, and this in turn to the mercuric salt of L-β-aspartyl-DL-homocysteinylglycine by the procedures described in Example III for the α-glutamyl peptide. The mercuric salt is washed with water until free of inorganic sulfate as indicated by absence of a precipitate with 0.1N barium hydroxide. A portion of the mercuric salt is dried in a vacuum oven at 45° C. over phosphorus pentoxide for analysis.

Analysis.—Calculated for $C_{20}H_{30}Hg_3N_6S_2O_{12}$: N, 6.93%; S, 5.29%. Found: N, 6.82%, 6.53%; S, 5.67%, 5.63%.

*Example XV.—L-β-aspartyl-DL-homocysteinylglycine*

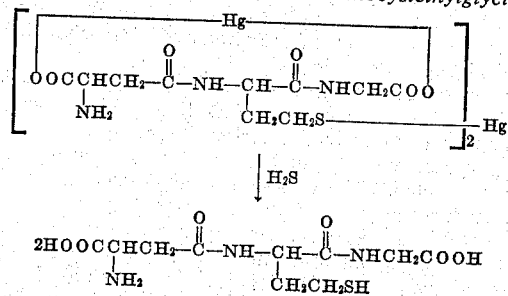

An aqueous solution of the mercuric salt of L-β-aspartyl-DL-homocysteinylglycine of Example XIV is converted to the free tripeptide by the procedure of Example IV except that treatment with hydrogen sulfide is continued for twenty hours. There is obtained 2.31 g. (62% yield) of L-β-aspartyl-DL-homocysteinylglycine monohydrate.

Analysis.—Calculated for $C_{10}H_{17}N_3SO_6 \cdot H_2O$: N, 12.92%; S, 9.86%. Found: N, 12.67%, 12.40%; S, 9.49%, 9.46%.

The examples have illustrated the products of this invention by reference to certain glutamylhomocysteinylglycines and to such tripeptides having their amino, carboxyl, and thiol groups protected with certain radicals. However, this invention includes tripeptides of glutamic or aspartic acid, homocysteine and glycine and derivatives of such tripeptides having their functional groups protected by ester, amide, carbamate, thioester or benzylthioether groups, and their disulfides or salts generally. The various optical enantiomorphs that are possible, i. e., the D- and the L- enantiomorphs and the optically inactive mixtures of isomers or the racemic compound of the enantiomorphs known as the DL-isomers, are also included. Additional specific examples of such tripeptides and their derivatives which are included are the following: DL-α-glutamyl-DL-homocysteinylglycine, D-γ-glutamyl-DL-homocysteinylglycine, α-glutamyl-S-acetyl-L-homocysteinylglycine, N-carboallyloxy-D-γ-glutamyl-S-benzyl-D-homocysteinylglycine, L-γ-glutamyl-L-homocysteinyl-glycine hydrobromide, dimethyl N-carboethoxy-L-α-glutamyl-S-benzyl-D-homocysteinylglycinate, ethyl N-benzoyl-L-γ-glutamyl-S-benzyl-DL-homocysteinylglycinate, L-α-aspartyl-S-benzyl-L-homocysteinylglycine, D-γ-glutamyl-L-homocysteinylglycine, D-α-aspartyl-DL-homocysteinylglycine, D-α-aspartyl-D-homocysteinylglycine, D-α-aspartyl-L-homocysteinylglycine, L-α-aspartyl-D-homocysteinylglycine, L-α-aspartyl-L-homocysteinylglycine, and L-γ-glutamyl-D-homocysteinylglycine.

The blocking, or protecting, of the amino groups during the synthesis of the tripeptides of this invention has been illustrated in the examples by the use of the carbobenzyloxy

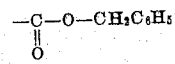

group since this particular blocking group is of quite general utility. It is especially useful when it is desired to prepare tripeptides having free amine groups, and when it is desired to minimize racemization of optical isomers. It can be removed by catalytic hydrogenation, by treatment with sodium and liquid ammonia, phosphonium iodide, or hydrogen halides in glacial acetic acid, and is therefore the preferred amine-blocking group. However, other amine-blocking groups can be used in some cases if desired. Examples of other amine-protecting groups which can be used include carboallyloxy

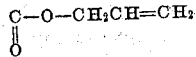

carboethoxy

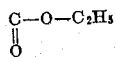

and simple acyl groups, such as for example, benzoyl, phthaloyl, acetyl, and p-toluenesufonyl groups. Benzoyl and carboethoxy groups can be removed from the tripeptides only by hydrolysis.

Protection of the carboxyl groups in the amino acids which are to be coupled by peptide linkages is preferably accomplished by their conversion to ester groups. For this purpose, methyl, ethyl or benzyl ester groups are usually selected. The methyl and ethyl esters are easily converted to the free acids by careful saponification after the peptide has been formed. However, benzyl ester-blocking groups can frequently be removed by catalytic hydrogenolysis. By this latter method, a peptide having an amine group protected by a carbobenzyloxy group and a carboxyl group protected by the benzyl ester group can be converted to the free tripeptide in one step by catalytic hydrogenation.

The free mercapto group in the homocysteinyl moiety of the tripeptides of this invention can be protected by any group which can be removed by reduction. Suitable groups of this type are the thioester and benzylthioether groups. Specific examples of operable thioester groups include acetylthio, benzoylthio, and phthaloylthio groups. Such groups are readily reduced to free mercapto groups by reaction with sodium in liquid ammonia. The removal of the thioester and benzylthioether groups may be easily verified by paper chromatography. The preparation of paper chromatograms and detection of free mercapto groups by means of alkaline sodium nitroprusside reagent is described by Toennies and Kolb in Anal. Chem. 23, 823 (1951).

The coupling of the α-glutamyl derivative with the homocysteinylglycine derivative has been illustrated in the examples by the method involving the formation of a specific mixed carbonic-carboxylic anhydride, viz., the mixed anhydride of isobutylcarbonic acid and the protected α-glutamyl derivative; and the reaction of this particular protected α-glutamyl derivative with the amino group of the protected homocysteinylglycine derivative. This method is preferred for the preparation of α-glutamyl and α-aspartyl derivatives since (a) the reaction proceeds under mild conditions, i. e., at low temperatures and in neutral solutions, (b) the reaction proceeds rapidly and without racemization of optical isomers, and (c) good yields of pure products are obtained. However, mixed anhydrides of the protected α-glutamyl or α-aspartyl derivatives with other types of acids can be used if desired, for example, mixed anhydrides of the α-glutamyl or α-aspartyl derivatives with carboxylic acids prepared by reaction of the amino acid derivative with an acyl chloride, e. g., benzoyl chloride or isovaleryl chloride. Still other mixed anhydrides prepared from the protected amino acid and chlorophosphite esters, or mono- or diesters of phosphoric acid can be used if desired.

The coupling of the γ-glutamyl derivative with the homocysteinylglycine derivative has been illustrated in the examples by the azide method. However, the γ-glutamyl peptides can also be prepared by the mixed anhydride and acid chloride methods by starting with α-methyl N-carbobenzyloxyglutamate.

The glutamyl- and aspartylhomocysteinylglycines of this invention possess important advantages in comparison with the known glutamyl and aspartyl cysteinylglycines and their derivatives. For example, the cuprous salt of L-γ-glutamyl-DL-homocysteinylglycine is soluble in water. In contrast to this, the cuprous salt of the cysteinyl homolog, L-γ-glutamyl-L-cysteinylglycine (glutathione) is insoluble in water. The water solubility of the homocysteinyl compound permits the formulation of aqueous solutions which can be used to apply the tripeptide to plants as fungicides and the like.

Another unexpected property of the tripeptides of this invention is illustrated by their biological activity. For example, L-α- and L-γ-glutamyl-DL-homocysteinylglycine inhibit glutathione in the reaction in which the enzyme glyoxalase, in the presence of glutathione, oxidizes methylglyoxal to lactic acid. In this reaction, illustrated by the equation

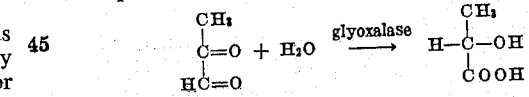

the glyoxalase requires glutathione for its action. The reaction can be followed by allowing the enzyme to act upon methylglyoxal in the presence of bicarbonate-carbonic acid buffer. The lactic acid which is formed releases carbon dioxide, and the increase in volume is measured manometrically.

L-γ-glutamyl-DL-homocysteinylglycine and L-α-glutamyl-DL-homocysteinylglycine weakly stimulated the glyoxalase system (glyoxalase prepared from cells of *E. coli*), and markedly reduced the stimulation caused by glutathione as demonstrated in the following Tables I and II. In the experiments on which Table I is based, the glyoxalase prepared from cells of *E. coli* was used.

*Table 1*

| Additions to Glyoxalase System | $CO_2$ Produced in 3 Minute Reaction, in Microliters |
| --- | --- |
| No additions | 2 |
| 3 mg. glutathione (GSH) | 81 |
| 3 mg. γ-isomer | 37 |
| 3 mg. GSH+3 mg. γ-isomer | 64 |
| 3 mg. α-isomer | 28 |
| 3 mg. GSH+3 mg. α-isomer | 57 |

In the experiments on which Table II is based, purified glyoxalases I and II, prepared from baker's yeast and beef liver by the method of E. Racker, J. Biol. Chem. 190, 685–696 (1951), were used.

Table II

| Additions to Glyoxalase System | CO₂ Produced in 20 Minute Reaction, in Microliters |
|---|---|
| No additions | 10–18 |
| 80 μg. glutathione (GSH) | 490 |
| 2,000 μg. α-isomer | 22 |
| 80 μg. GSH+2000 μg. α-isomer | 320 |
| 60 μg. glutathione | 214 |
| 1,000 μg. γ-isomer | 26 |
| 60 μg. GSH+1,000 μg. γ-isomer | 185 |
| 50 μg. GSH | 207 |
| 50 μg. GSH+3,000 μg. γ-isomer | 99 |

L-β-aspartyl-DL-homocysteinylglycine markedly reduced the stimulation of the glyoxalase system caused by glutathione as demonstrated in Table III. In the experiments in which this table is based, pure glyoxalases I and II, prepared from baker's yeast and beef liver, were used.

Table III

| Additions to Glyoxalase System | CO₂ Produced in 30 Minute Reaction, in Microliters |
|---|---|
| No additions | 21 |
| 1,000 μg. β-aspartyl isomer | 21 |
| 50 μg. glutathione (GSH) | 301 |
| 50 μg. GSH+500 μg. β-aspartyl isomer | 248 |
| 50 μg. GSH+3,000 μg. β-aspartyl isomer | 184 |
| 50 μg. GSH+10,000 μg. β-aspartyl isomer | 66 |

Since these aspartyl- and glutamylhomocysteinylglycines inhibit this glutathione reaction, they can be used to interrupt processes catalyzed by glutathione. Thus, the undesirable types of growth, such as weeds and the fungal and bacterial diseases of plants, can be retarded.

As an illustration of the fungicidal activity of homocysteinyl tripeptides, L-γ-glutamyl-DL-homocysteinylglycine is effective in the control of early blight in tomatoes and potatoes. In tests on tomato plants which have been inoculated with early blight by conventional methods, this particular tripeptide is more effective at 0.2% concentration, than the commercial fungicide Copper A compound (tetra copper calcium oxychloride) in controlling this disease.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A glutamylhomocysteinylglycine.
2. A glutamyl-DL-homocysteinylglycine.
3. A homocysteinylglycine tripeptide wherein the third peptide component is that of an amino acid

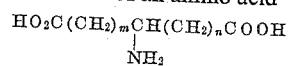

wherein one of $m$ and $n$ is zero and the other is a positive integer not greater than 2.

4. A heterotripeptide of homocysteine, glycine, and an amino acid

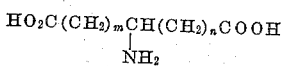

wherein one of $m$ and $n$ is zero and the other is a positive integer not greater than 2.

5. A heterotripeptide compound of the class consisting of a tripeptide, its derivatives with the carboxyl groups protected by esterification, the amino and thiol groups by acylation, and the thiol group by benzylation and salts and disulfides thereof, said tripeptide being a heterotripeptide of homocysteine, glycine, and an amino acid

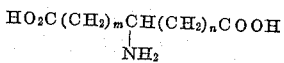

wherein one of $m$ and $n$ is zero and the other is a positive integer not greater than 2.

6. An aspartylhomocysteinylglycine.
7. L-β-aspartyl-DL-homocysteinylglycine.
8. L-γ-glutamyl-DL-homocysteinylglycine.
9. L-α-glutamyl-DL-homocysteinylglycine.

References Cited in the file of this patent

UNITED STATES PATENTS 2,498,665  Emerson _____ Feb. 28, 1950

OTHER REFERENCES

Hess et al.: J. Biol. Chem., vol. 149, pp. 543–8 (1943).
Anson et al.: "Advances in Protein Chem.," vol. 5, pp. 43, 44 (1949).